United States Patent
Uematsu et al.

(10) Patent No.: US 11,719,197 B2
(45) Date of Patent: Aug. 8, 2023

(54) FUEL TANK SYSTEM

(71) Applicant: MITSUBISHI JIDOSHA KOGYO KABUSHIKI KAISHA, Tokyo (JP)

(72) Inventors: Kyosuke Uematsu, Tokyo (JP); Takuya Ohshima, Tokyo (JP); Hideo Matsunaga, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 17/631,282

(22) PCT Filed: Jul. 29, 2020

(86) PCT No.: PCT/JP2020/029172
§ 371 (c)(1),
(2) Date: Jan. 28, 2022

(87) PCT Pub. No.: WO2021/020488
PCT Pub. Date: Feb. 4, 2021

(65) Prior Publication Data
US 2022/0252024 A1    Aug. 11, 2022

(30) Foreign Application Priority Data
Jul. 30, 2019  (JP) .................................. 2019-139522

(51) Int. Cl.
*F02M 35/09*    (2006.01)
*F02M 25/08*    (2006.01)
(Continued)

(52) U.S. Cl.
CPC ......... *F02M 25/0809* (2013.01); *B60K 15/04* (2013.01); *F02M 25/0836* (2013.01);
(Continued)

(58) Field of Classification Search
CPC .......... F02M 25/0809; F02M 25/0836; F02M 35/09; F02M 2025/0845; B60K 15/04; B60K 2015/0321
See application file for complete search history.

(56) References Cited

U.S. PATENT DOCUMENTS

| | | | | |
|---|---|---|---|---|
| 5,143,035 A | * | 9/1992 | Kayanuma | F02M 25/08 123/520 |
| 8,560,167 B2 | * | 10/2013 | Jentz | G01M 15/09 701/32.7 |

(Continued)

FOREIGN PATENT DOCUMENTS

| | | |
|---|---|---|
| JP | 4110931 B2 | 7/2008 |
| JP | 6015936 B2 | 10/2016 |

OTHER PUBLICATIONS

International Search Report for PCT/JP2020/029172 dated Sep. 29, 2020.

(Continued)

*Primary Examiner* — Gonzalo Laguarda
(74) *Attorney, Agent, or Firm* — Birch, Stewart, Kolasch & Birch, LLP

(57) ABSTRACT

In a fuel tank system, a control unit diagnoses a failure of a fuel storage unit and a processing unit. The fuel storage unit includes a vapor passage through which a fuel tank and a sealing valve are communicated with each other, a first pressure detection unit, and a second pressure detection unit disposed at a position different from the first pressure detection unit. The control unit specifies a presence or an absence of a clogging of the vapor passage based on a first pressure value detected by the first pressure detection unit and a second pressure value detected by the second pressure detection unit when the pressure in the fuel tank is changed by the pressure generation unit in a condition that the sealing valve is controlled to be opened.

16 Claims, 9 Drawing Sheets

(51) Int. Cl.
*B60K 15/04* (2006.01)
*B60K 15/03* (2006.01)

(52) U.S. Cl.
CPC ...... *B60K 2015/0321* (2013.01); *F02M 35/09* (2013.01); *F02M 2025/0845* (2013.01)

(56) References Cited

U.S. PATENT DOCUMENTS

| | | | |
|---|---|---|---|
| 9,599,071 B2* | 3/2017 | Dudar | F02M 25/0836 |
| 9,739,244 B2* | 8/2017 | Dudar | F02D 41/003 |
| 10,138,846 B1* | 11/2018 | Dudar | F02D 41/22 |
| 10,533,506 B2* | 1/2020 | Dudar | F02M 25/0836 |
| 11,542,896 B2* | 1/2023 | Dudar | F02D 41/004 |
| 2004/0089063 A1 | 5/2004 | Matsubara et al. | |
| 2006/0059979 A1 | 3/2006 | Matsubara et al. | |
| 2006/0059980 A1 | 3/2006 | Matsubara et al. | |
| 2014/0174573 A1* | 6/2014 | Matsunaga | F02M 25/0809 137/565.23 |
| 2022/0341376 A1* | 10/2022 | Kawase | F02M 25/0818 |

OTHER PUBLICATIONS

Written Opinion of the International Searching Authority for PCT/JP2020/029172 dated Sep. 29, 2020.

* cited by examiner

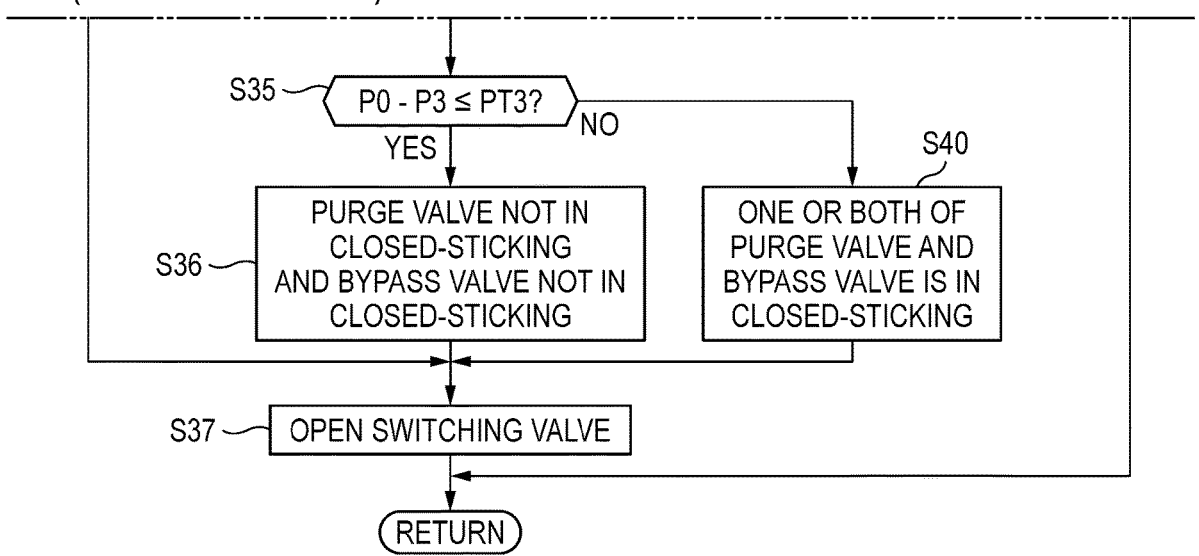

(CONT.)

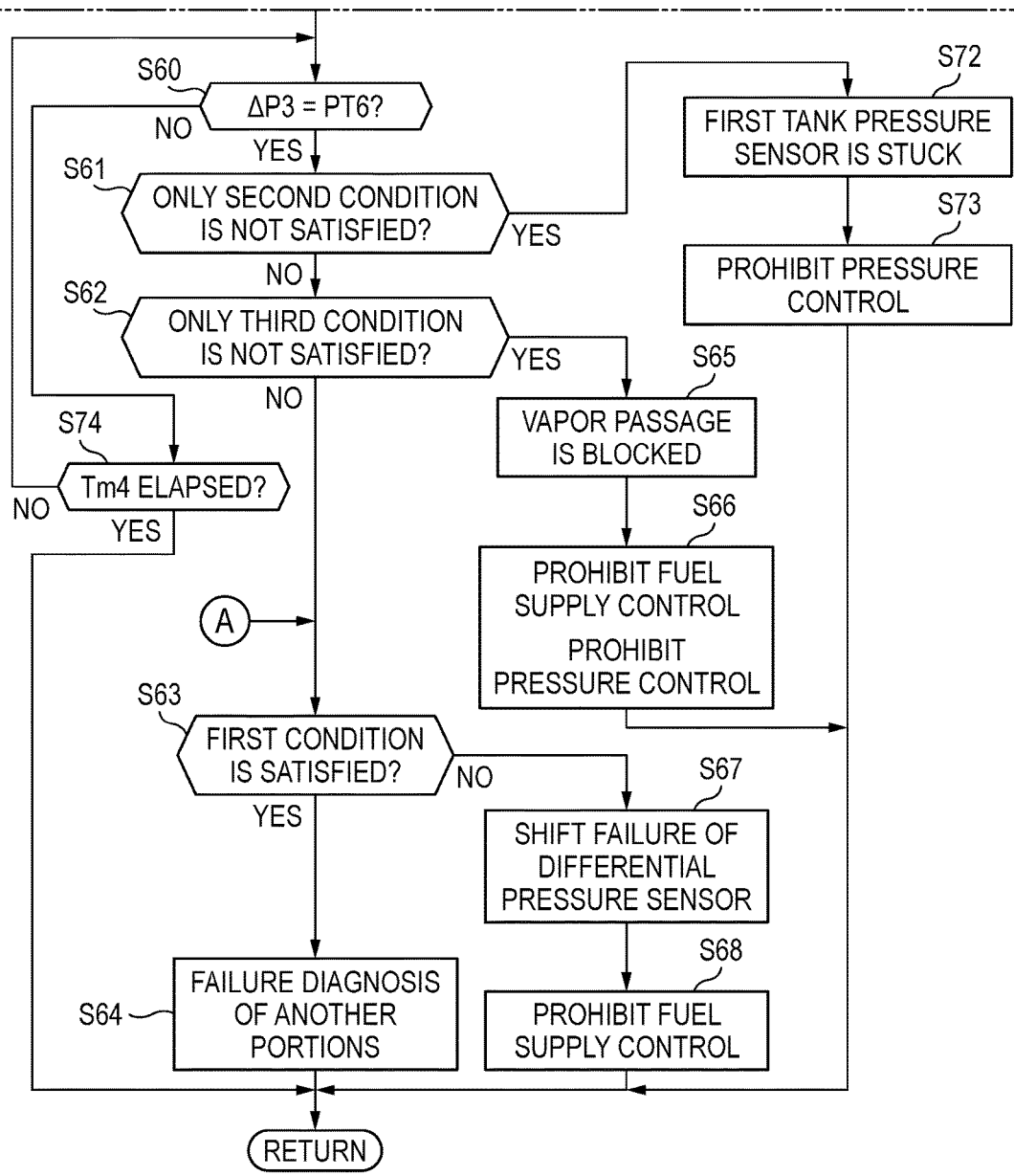

FUEL TANK SYSTEM

TECHNICAL FIELD

The present disclosure relates to a fuel tank system.

BACKGROUND ART

In the related art, there has been known a fuel tank system that seals a fuel tank mounted on a vehicle having an internal combustion engine in order to prevent fuel evaporative gas generated in the fuel tank from being discharged to the atmosphere (for example, JP4110931B2 and JP6015936B2). A fuel tank system of JP4110931B2 includes a sealing valve that controls a communication state between a fuel tank and a canister. In the fuel tank system of JP4110931B2, the sealing valve is closed to seal the fuel tank while the internal combustion engine is stopped, and the sealing valve is opened when the fuel is supplied to the fuel tank. A fuel tank system of JP6015936B2 includes a sealing valve, a first on-off valve that opens and closes between a communication passage and an intake passage of an internal combustion engine, and a second on-off valve that opens and closes between a canister and the communication passage. In the fuel tank system of JP6015936B2, when the pressure of the fuel tank is lowered, the sealing valve and the first on-off valve are opened, and the second on-off valve is closed.

In the fuel tank system of JP4110931B2 and the fuel tank system of JP6015936B2, a change in pressure in the fuel tank is detected by opening the sealing valve from a closed state in order to diagnose a failure of the sealing valve.

However, in the fuel tank system of JP4110931B2 and the fuel tank system of JP6015936B2, a diagnosis of a clogging of a vapor passage is not performed. Since the vapor passage connects the fuel tank and the sealing valve to each other, it becomes the same situation as the sealing valve is closed-sticking when the vapor passage is clogged.

SUMMARY OF INVENTION

An embodiment of the present disclosure provides a fuel tank system capable of diagnosing a failure of a vapor passage.

Solution to Problem

A fuel tank system according to the present disclosure is a fuel tank system for a vehicle having an internal combustion engine. The fuel tank system according to the present disclosure includes a fuel storage unit, a processing unit, and a control unit. The fuel storage unit has a sealing valve and seals a fuel tank that stores fuel. The processing unit processes fuel evaporative gas in the fuel tank. The control unit diagnoses a failure of the fuel storage unit and the processing unit. The fuel storage unit includes a first pressure detection unit, a second pressure detection unit, and a vapor passage. The first pressure detection unit detects a pressure of the fuel tank. The second pressure detection unit is disposed at a position different from the first pressure detection unit and detects a pressure of the fuel tank. The vapor passage connects the fuel tank and the sealing valve with each other. The processing unit includes a purge passage, a first on-off valve, a canister, and a pressure generation unit. The purge passage connects the sealing valve and an intake passage of the internal combustion engine with each other. The first on-off valve opens and closes a communication between the intake passage and the purge passage. The canister is connected to the purge passage between the sealing valve and the first on-off valve, and adsorbs fuel evaporative gas in the fuel tank. The pressure generation unit is connected to the canister and generated pressure. The control unit is configured to specify a presence or an absence of a clogging of the vapor passage based on a first pressure value detected by the first pressure detection unit and a second pressure value detected by the second pressure detection unit when the pressure in the fuel tank is changed by the pressure generation unit in a condition that the sealing valve is controlled to be opened.

According to this fuel tank system, the presence and the absence of the clogging of the vapor passage is specified using the two pressure detecting units. Thereby, a failure diagnosis system for the fuel tank system that is capable of diagnosing the failure of the vapor passage is provided.

The control unit may record a presence or an absence of a sticking of the second pressure detection unit, during an ignition switch of the vehicle is switched on. The control unit may specify that the vapor passage is clogged, when the first pressure value is changed, the second pressure value is unchanged, and there is no sticking in the second pressure detection unit, after a predetermined time period has passed in a condition that the sealing valve is opened and the pressure in the fuel tank is changed by the pressure generation unit.

The control unit may perform a pressure control and a fuel supply control. In the pressure control, the pressure in the fuel tank is lowered. The fuel supply control enables a fuel supply port to be opened. The fuel supply port is a supply port of the fuel tank. The control unit may prohibit the pressure control and the fuel supply control, when the vapor passage is specified as being clogged.

The first pressure detecting unit may include an absolute pressure sensor configured to detect an absolute pressure in the fuel tank. The second pressure detecting unit may include a differential pressure sensor configured to detect the pressure in the fuel tank based on an atmospheric pressure.

The first pressure detecting unit may be provided to the vapor passage, and the second pressure detecting unit may be provided to the fuel tank.

DESCRIPTION OF EMBODIMENTS

Hereinafter, embodiments of the present disclosure will be described with reference to the drawings.

Figure 1:
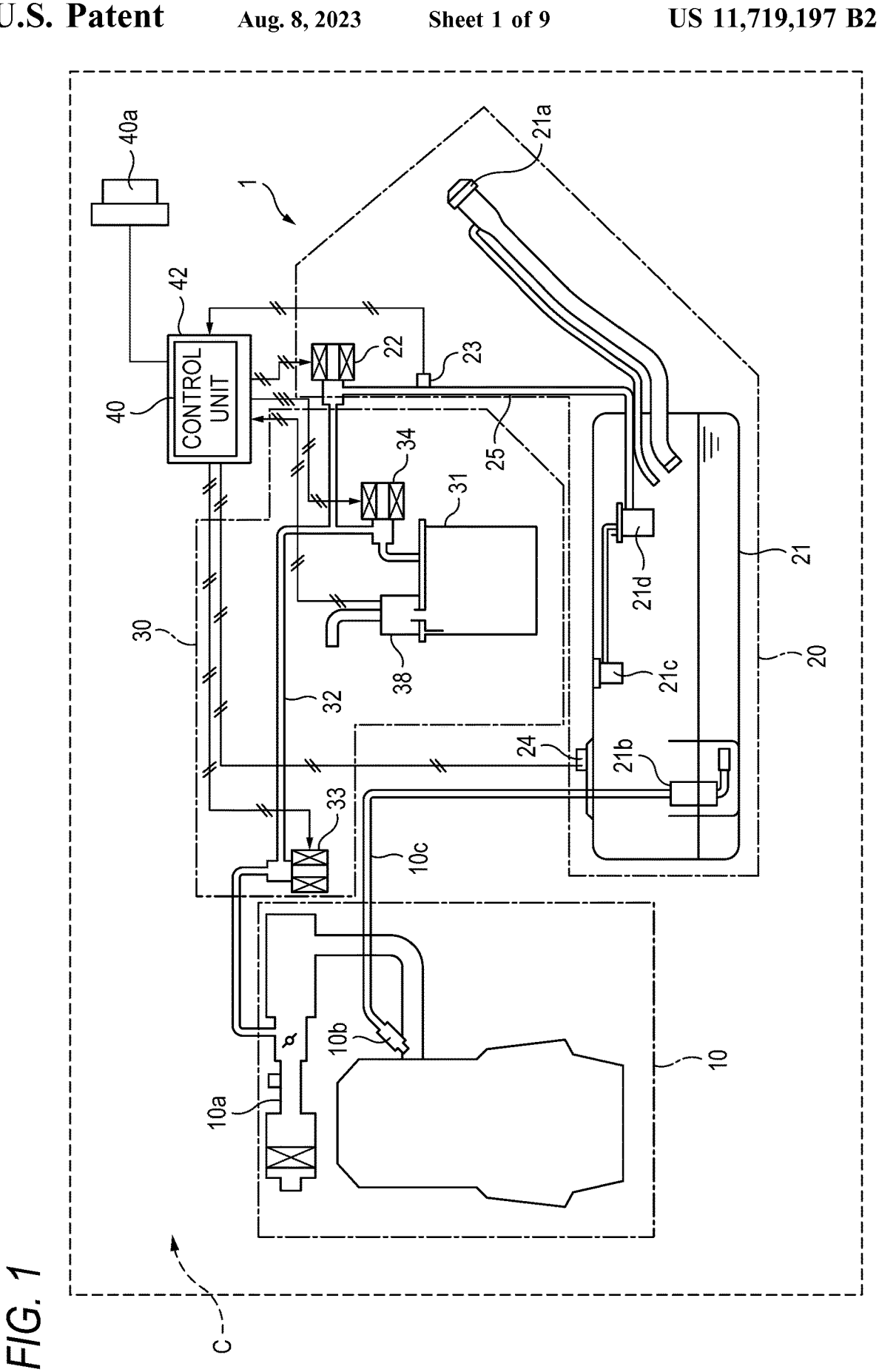
FIG. 1 is a diagram showing a configuration of a fuel tank system according to an embodiment of the present disclosure.

As shown in FIG. 1, a fuel tank system 1 includes a fuel storage unit 20, a processing unit 30, and a control unit 40. The fuel tank system 1 is mounted on a vehicle C. In the present embodiment, the vehicle C includes a motor (not shown) and an internal combustion engine 10, and is a hybrid vehicle or a plug-in hybrid vehicle that travels using one or both of the motor and the internal combustion engine 10. The vehicle C includes an ignition switch 40a. The ignition switch 40a is electrically connected to an electrical control unit (ECU) 42, which will be described later. The control unit 40 is activated when the ignition switch 40a is turned on by the user of the vehicle C. The control unit 40 enters a sleep state when the ignition switch 40a is turned off by the user. The internal combustion engine 10 includes an intake passage 10a, a fuel injection valve 10b, and a fuel pipe 10c, and mixes and combusts air sucked from the intake passage 10a and fuel injected from the fuel injection valve 10b.

The fuel storage unit 20 includes a fuel tank 21, a sealing valve 22, a first tank pressure sensor (an example of a first pressure detection unit) 23, a second tank pressure sensor (an example of a second pressure detection unit) 24, and a vapor passage 25. The fuel storage unit 20 seals the fuel tank 21.

The fuel tank 21 includes a fuel supply port 21a, a fuel pump 21b, a fuel cutoff valve 21c, and a leveling valve 21d. The fuel supply port 21a is a fuel inlet to the fuel tank 21. The fuel pump 21b supplies fuel from the fuel tank 21 to the fuel injection valve 10b via the fuel pipe 10c. The fuel cutoff valve 21c prevents the fuel from flowing out from the fuel tank 21 to the processing unit 30. The leveling valve 21d controls a liquid level in the fuel tank 21 at the time of fuel supply. The fuel evaporative gas generated in the fuel tank 21 is discharged to the processing unit 30 via the fuel cutoff valve 21c and the leveling valve 21d.

The sealing valve 22 seals the fuel tank 21 by opening and closing the vapor passage 25. In the present embodiment, the sealing valve 22 is an electromagnetic solenoid valve, and is a normally closed type electromagnetic valve that is closed when the electromagnetic solenoid is in a non-energized state (OFF) and is opened when a drive signal is supplied to the electromagnetic solenoid from the outside and the electromagnetic solenoid is in an energized state (ON). The vapor passage 25 allows the fuel tank 21 and the sealing valve 22 to communicate with each other.

The first tank pressure sensor 23 is disposed on the vapor passage 25 and detects the pressure in the fuel tank 21 in the vapor passage 25. The first tank pressure sensor 23 is an absolute pressure sensor, and detects the pressure in the fuel tank 21 as an absolute pressure.

The second tank pressure sensor 24 is disposed at a position different from that of the first tank pressure sensor 23. In the present embodiment, the second tank pressure sensor 24 is disposed above the fuel tank 21. The second tank pressure sensor 24 is a differential pressure type sensor that detects the pressure by a difference from the atmospheric pressure, and detects the pressure in the fuel tank 21 as a gauge pressure.

The first tank pressure sensor 23 is provided so as to be able to detect the pressure mainly even when the pressure in the fuel tank 21 increases. On the other hand, the second tank pressure sensor 24 is provided so as to be able to detect whether or not the pressure in the fuel tank 21 is near the atmospheric pressure mainly at the time of fuel supply. Therefore, the first tank pressure sensor 23 has a wider range of pressure that can be detected than that of the second tank pressure sensor 24. On the other hand, the second tank pressure sensor 24 can detect the pressure more accurately than the first tank pressure sensor 23.

Figure 2:
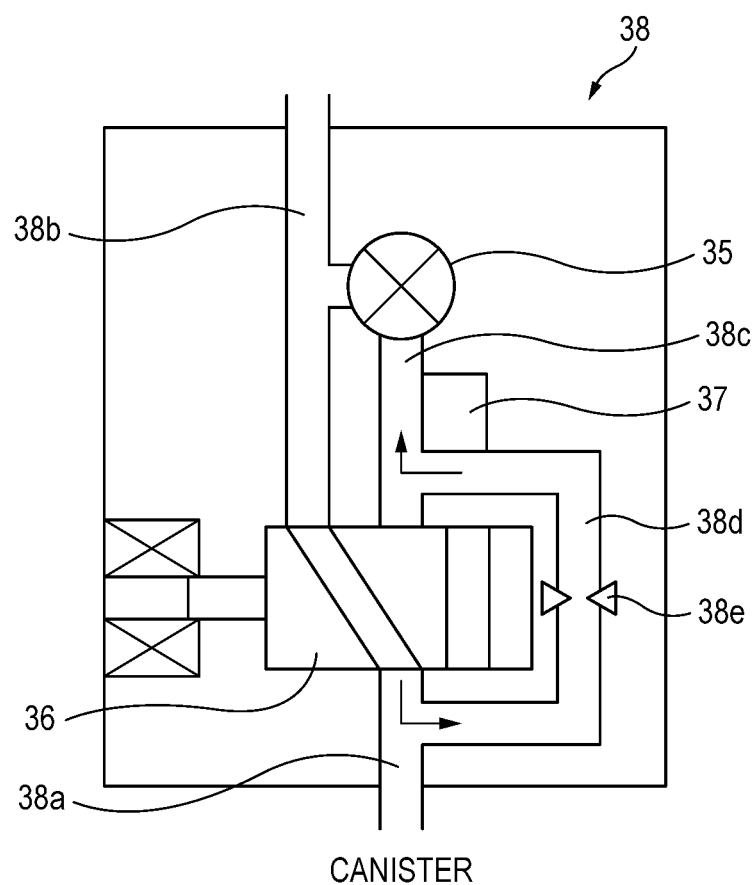
FIG. 2 is a diagram showing a switching valve of FIG. 1 in an opened state.

As shown in FIGS. 1 and 2, the processing unit 30 includes a canister 31, a purge passage (communication passage) 32, a purge valve (an example of a first on-off valve) 33, a bypass valve (an example of a second on-off valve) 34, a negative pressure pump (an example of a pressure generation unit) 35, a switching valve 36, and a canister pressure sensor (an example of a third pressure detection unit) 37. The processing unit 30 performs processing by combusting the fuel evaporative gas of the fuel tank 21 in the internal combustion engine 10 or causing the fuel evaporative gas to be adsorbed by the canister 31.

The canister 31 adsorbs the fuel evaporative gas in the fuel tank 21. The purge passage 32 allows the sealing valve 22 and the intake passage 10a of the internal combustion engine 10 to communicate with each other. The canister 31 includes activated carbon therein, and adsorbs the fuel evaporative gas generated in the fuel tank 21 by the activated carbon. The canister 31 is connected to a passage branched from the purge passage 32. The canister 31 is provided to supply the fuel evaporative gas adsorbed by the canister 31 to the intake passage 10a via the purge passage 32.

The purge valve 33 opens and closes between the intake passage 10a and the purge passage 32. In the present embodiment, the purge valve 33 is an electromagnetic solenoid valve, and is opened in response to an instruction from the control unit 40 to supply the fuel evaporative gas to the intake passage 10a at the time of pressure control and purge control (release control), which will be described later. The purge valve 33 is, for example, a normally closed type electromagnetic valve that is closed when the electromagnetic solenoid is in a non-energized state (OFF) and is opened when a drive signal is supplied to the electromagnetic solenoid from the outside and the electromagnetic solenoid is in an energized state (ON).

The bypass valve 34 opens and closes a communication between the canister 31 and the purge passage 32. In the present embodiment, the bypass valve 34 is an electromagnetic solenoid valve, and is closed in response to an instruction from the control unit 40 to cut off the supply of the fuel evaporative gas to the canister 31 in the case of pressure control to be described later. On the other hand, in the case of the purge control (release control), the bypass valve 34 is opened in response to an instruction from the control unit 40 to supply the fuel evaporative gas adsorbed by the canister 31 to the purge passage 32. The bypass valve 34 is, for example, a normally open type electromagnetic valve that is opened when the electromagnetic solenoid is in a non-energized state (OFF) and is closed when a drive signal is supplied to the electromagnetic solenoid from the outside and the electromagnetic solenoid is in an energized state (ON).

The negative pressure pump 35, the switching valve 36, and the canister pressure sensor 37 are provided in a module 38 connected to the canister 31. As shown in FIG. 2, the module 38 is provided with a canister side passage 38a, an atmosphere side passage 38b, a pump passage 38c, and a bypass passage 38d. The negative pressure pump 35 is provided between the pump passage 38c and the atmosphere side passage 38b. The bypass passage 38d is provided with a reference orifice 38e for generating a pressure serving as a reference for leak diagnosis. The canister pressure sensor 37 is provided in the pump passage 38c, and detects a pressure when a negative pressure is generated in the canister 31 by the negative pressure pump 35.

Figure 3:
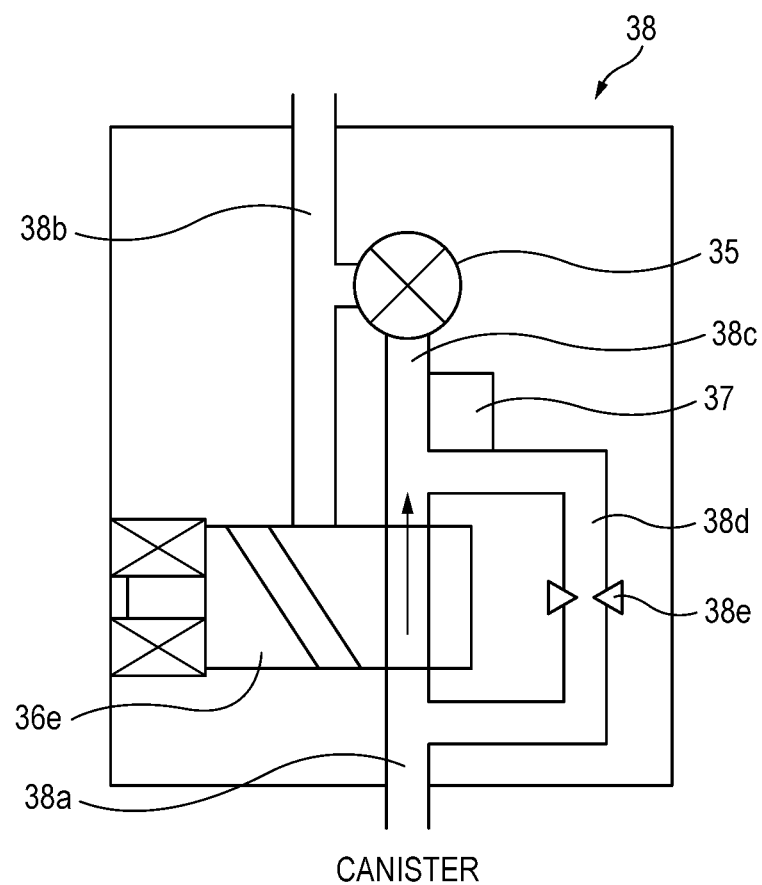
FIG. 3 is a diagram showing the switching valve of FIG. 1 in a closed state.

The switching valve 36 causes the canister side passage 38a and the atmosphere side passage 38b to communicate with each other in the opened state, so that the canister 31 is in an atmosphere open state. When the negative pressure pump 35 is operated in this state, a negative pressure corresponding to a diameter of the reference orifice 38e is generated in the pump passage 38c. The control unit 40 stores a value of the negative pressure detected by the canister pressure sensor 37 at this time as a reference pressure Pref. On the other hand, as shown in FIG. 3, the switching valve 36 causes the canister side passage 38a and the pump passage 38c to communicate with each other in the closed state, so that a negative pressure can be generated in the canister 31. In this state, when the negative pressure pump 35 generates a negative pressure in the canister 31, the negative pressure detected by the canister pressure sensor 37 becomes smaller than the reference pressure Pref in a case where a hole larger than the reference orifice 38e is present in the fuel storage unit 20 or the processing unit 30. In this way, the control unit 40 diagnoses the leakage of the fuel evaporative gas in the fuel storage unit 20 or the processing unit 30. The switching valve 36 is driven by, for example, an electromagnetic solenoid. The switching valve 36 is in an open state when the electromagnetic solenoid is in a non-energized state (OFF), and is in a closed state when a drive signal is supplied to the electromagnetic solenoid from the outside and the electromagnetic solenoid is in an energized state (ON).

The control unit 40 acquires information from each detection unit of the fuel storage unit 20 and the processing unit 30, and transmits a signal for controlling individual valve to each valve. In the present embodiment, "opening control" indicates that the control unit 40 transmits a control signal for bringing each valve into an opened state and instructs each valve to actually open. Each valve receives the control signal for opening control, and actually opens if there is no failure. Similarly, "closing control" indicates that the control unit 40 transmits a control signal for bringing each valve into a closed state and instructs each valve to actually close. Each valve receives the control signal for closing control, and actually closes if there is no failure.

The control unit 40 performs at least the first failure diagnosis, the second failure diagnosis, the third failure diagnosis, and a fail-safe control. When the pressure in the fuel tank 21 increases to a certain level or higher, the control unit 40 performs the opening control on the sealing valve 22 and the purge valve 33 and performs the closing control on the bypass valve 34, so as to decrease the pressure in the fuel tank 21. In addition, the control unit 40 performs the opening control on the sealing valve 22 and the bypass valve 34 to set the pressure of the fuel tank 21 to the atmospheric pressure at the time of fuel supply when a fuel supply button, which is not shown in Figures, is pressed. In this way, the control unit 40 performs pressure control (depressurization control) for decreasing the pressure in the fuel tank 21, and records that there is an abnormality when the pressure does not decrease. In addition, the control unit 40 performs the opening control on the purge valve 33 and the bypass valve 34, and performs purge control (release control) for sucking the fuel evaporative gas adsorbed by the canister 31 into the internal combustion engine 10 in operation. Further, when the pressure control at the time of fuel supply is completed, the control unit 40 performs fuel supply control for unlocking the lock of a fuel lid (not shown) so that the fuel supply port 21a can be opened and notifying the user of the vehicle C. On the other hand, for example, when the fuel supply control is prohibited (fuel supply is prohibited) as the fail-safe control, the control unit 40 does not unlock the lock of the fuel lid and notifies the user that fuel supply is prohibited.

In the present embodiment, the control unit 40 is a functional configuration implemented by software stored in the ECU 42. The ECU 42 is actually implemented by a microcomputer including an arithmetic device including a timer, a memory, an input and output buffer, and the like. The ECU 42 controls the various devices so that the internal combustion engine 10 is in a desired operating state based on signals from the sensors and the various devices, and maps and programs stored in the memory. Various types of control are not limited to processing by software, and may be processed by dedicated hardware (electronic circuit). The sensors and the valves are electrically connected to the ECU 42.

Figure 5:
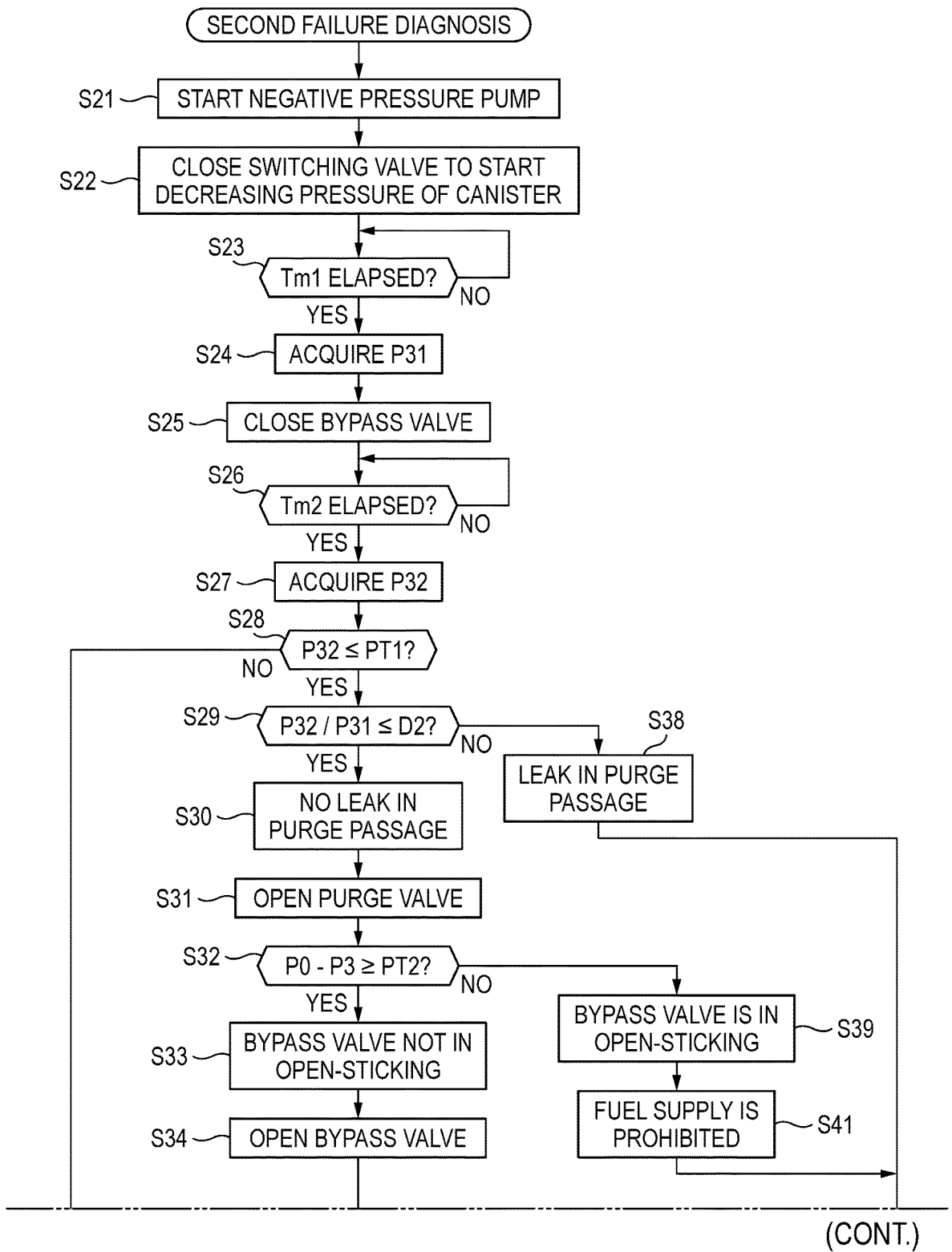
FIG. 5 is a flowchart of a second failure diagnosis performed by the control unit of FIG. 1.
Figure 6:
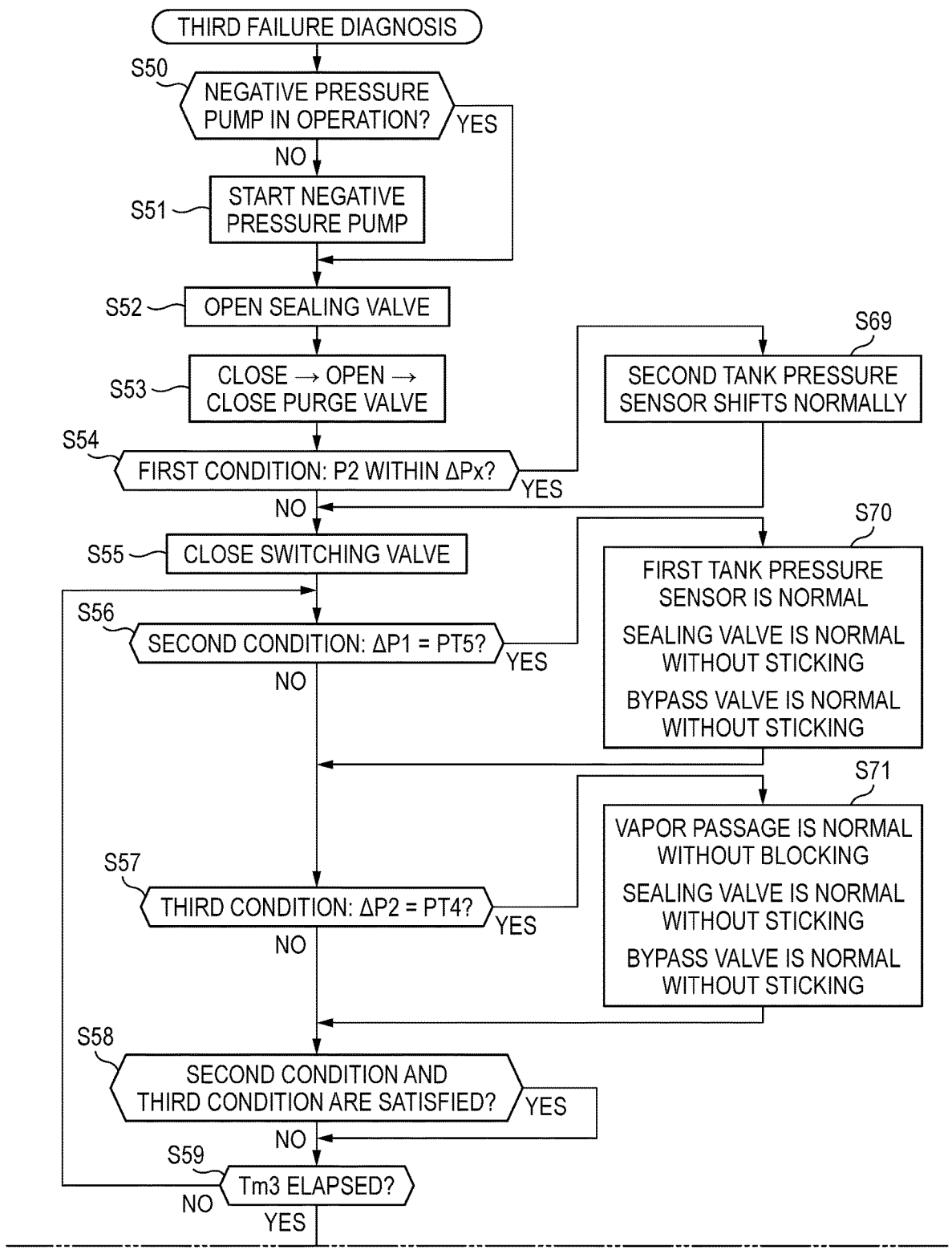
FIG. 6 is a flowchart of a third failure diagnosis performed by the control unit of FIG. 1.
Figure 7:
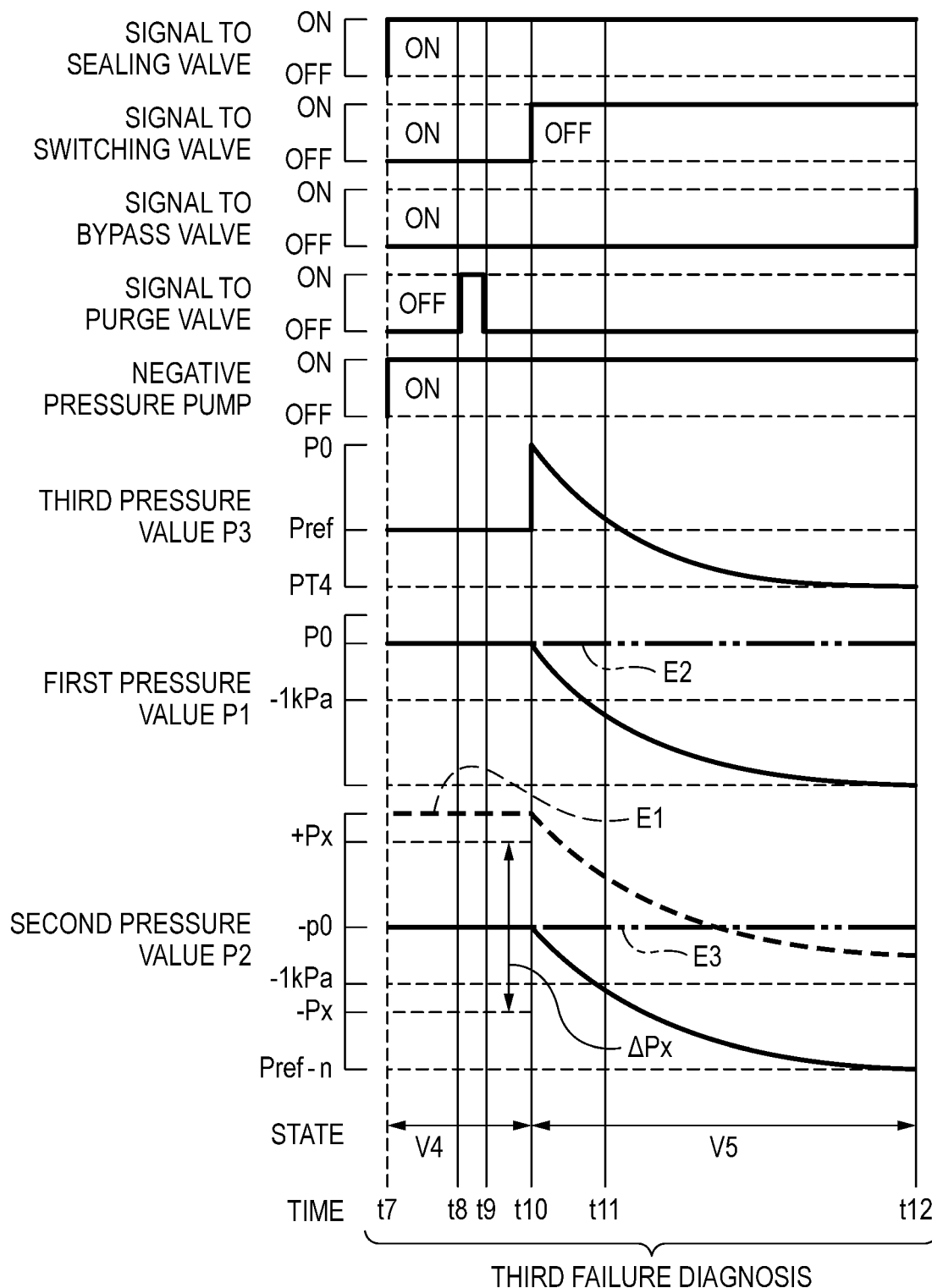
FIG. 7 is a timing chart in the third failure diagnosis of FIG. 6.

Next, a control procedure of the control unit 40 of the present disclosure will be described with reference to flowcharts of FIGS. 4, 5 and 6, and a timing chart of FIG. 7. Note that ON-OFF corresponding to various devices in each timing chart indicates a state in which the control unit 40 transmits a control signal instructing the various devices to be energized (ON) and de-energized (OFF) to the various devices. That is, the ON-OFF state of each timing chart does not indicate an actual operation state of the various devices. A value of a sensor in each timing chart is a value acquired from individual sensor, and is not a value indicating an actual pressure of various devices. That is, each timing chart is a timing chart corresponding to the control procedure of the control unit 40.

Figure 4:
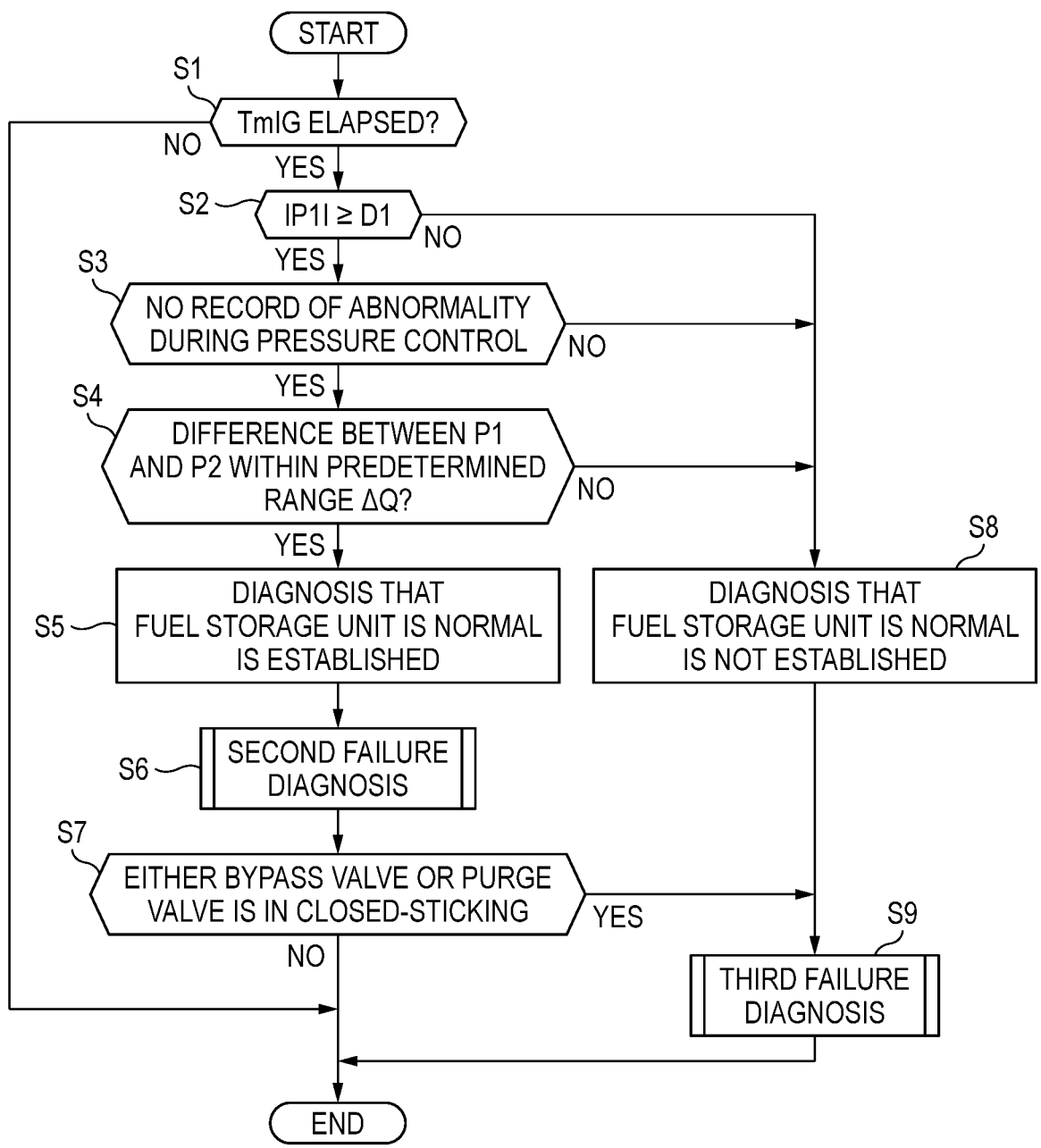
FIG. 4 is a flowchart of a first failure diagnosis performed by a control unit of FIG. 1.

FIG. 4 shows a control procedure in the first failure diagnosis performed by the control unit 40. After the ignition switch 40a is turned off, the control unit 40 starts the first failure diagnosis for diagnosing a failure of the fuel storage unit 20 in a state where the sealing valve 22 is closed after a predetermined period TmIG elapses (S1). Here, the state in which the sealing valve 22 is closed refers to a state in which the sealing valve 22 is subjected to the closing control, and is a state in which the control unit 40 does not transmit a control signal for instructing the sealing valve 22 to be energized (ON). The control unit 40 acquires a first pressure value P1 detected by the first tank pressure sensor 23. When the absolute value of the first pressure value P1 is equal to or greater than a first predetermined value D1 (Yes in S2), the control unit 40 proceeds the process to S3.

The control unit 40 acquires a record of abnormality during the pressure control, and if there is no record of abnormality (Yes in S3), the process proceeds to S4. Here, the abnormality during the pressure control refers to a case where the pressure control when the pressure of the fuel tank 21 increases to a certain level or more does not end within a predetermined time, a case where the pressure control at the time of fuel supply does not end within a predetermined time, and a case where some kind of failure is not diagnosed in the fuel storage unit 20 and the processing unit 30 during these controls.

The control unit 40 acquires a second pressure value P2 detected by the second tank pressure sensor 24. The control unit 40 calculates a difference between the first pressure value P1 and the second pressure value P2. When the difference is within a predetermined range ΔQ (Yes in S4), the control unit 40 proceeds the process to S5. As described above, the first tank pressure sensor 23 and the second tank pressure sensor 24 are different from each other in the place where they are disposed and in the pressure detection characteristics. Therefore, although an actual pressure value in the fuel tank 21 is the same, the first pressure value P1 and the second pressure value P2 have a difference within the predetermined range ΔQ. The predetermined range ΔQ is a value set in advance according to the places where the first tank pressure sensor 23 and the second tank pressure sensor 24 are disposed and the pressure detection characteristics thereof.

The control unit 40 diagnoses that the fuel storage unit 20 is normal (S5). Then, the control unit 40 proceeds to the second failure diagnosis for diagnosing a failure of the processing unit 30 in a state where the sealing valve 22 is closed (S6).

When the absolute value of the first pressure value P1 is smaller than the first predetermined value D1 (No in S2), when there is an abnormality during the pressure control (No in S3), or when the difference between the first pressure value P1 and the second pressure value P2 is larger than the predetermined range ΔQ (No in S4), it is determined that there is a failure in the fuel storage unit 20, and the control unit 40 determines that the normal diagnosis is not established (S8). That is, the control unit 40 diagnoses that one or more of the first tank pressure sensor 23, the second tank pressure sensor 24, and the vapor passage 25 included in the fuel storage unit 20 have a failure. When the control unit 40 diagnoses that the fuel storage unit 20 is not normal, the control unit 40 performs the third failure diagnosis, which will be described later, by performing the opening control on the sealing valve 22, and specifies a failure portion (S9).

In addition, in the second failure diagnosis to be described later, when the control unit 40 diagnoses that there is a failure in the processing unit 30 (Yes in S7), the control unit 40 performs the third failure diagnosis by performing the opening control on the sealing valve 22, and specifies the failure portion (S9).

Next, a control procedure in the second failure diagnosis performed by the control unit 40 will be described with reference to the flowchart of FIG. 5. The second failure diagnosis is started in a state where the bypass valve 34 is subjected to the opening control.

The control unit 40 starts the negative pressure pump 35 (S21). At this time, a third pressure value P3 detected by the canister pressure sensor 37 decreases to the reference pressure Pref. Thereafter, the control unit 40 performs the closing control on the switching valve 36 to start decreasing the pressure of the canister 31 (S22). In this state, if the bypass valve 34 is actually opened in response to an instruction from the control unit 40, the purge passage 32 and the canister 31 are decreased in pressure. When a first predetermined period Tm1 has elapsed (Yes in S23) after the start of the pressure decrease (after the closing control of the switching valve 36), the control unit 40 acquires the third pressure value P3 of a first time as an acquired value P31 (S24). Thereafter, the control unit 40 performs the closing control on the bypass valve 34 (S25). When a second predetermined period Tm2 has elapsed after the pressure decrease (Yes in S26), the control unit 40 acquires the third pressure value P3 of a second time as the acquired value P32. When the acquired value P32, which is the third pressure value P3 of the second time, is equal to or less than a first predetermined pressure PT1 (Yes in S28), a ratio (P32/P31) of the acquired value P32, which is the third pressure value P3 of the second time, to the acquired value P31, which is the third pressure value P3 of the first time, is calculated, and when the ratio is equal to or less than a second predetermined value D2, it is diagnosed that there is no leak in the purge passage 32 (S30).

That is, the acquired value P31, which is the third pressure value P3 of the first time, is a value when the bypass valve 34 is subjected to the opening control, and is a pressure value of a space including the canister 31 and the purge passage 32 when the bypass valve 34 is actually opened. On the other hand, the acquired value P32, which is the third pressure value P3 of the second time, is a value when the bypass valve 34 is subjected to the closing control, and is a pressure value of a space including only the canister 31 and not including the purge passage 32 when the bypass valve 34 is actually closed. Therefore, if there is no leak in any of the canister 31 and the purge passage 32, the ratio between the acquired value P31 and the acquired value P32 becomes equal to or less than the second predetermined value D2. In addition, even when there is a possibility of leak only in the canister 31, both the acquired value P31 and the acquired value P32 are maintained in a state in which a pressure decrease amount is small. As a result, the ratio of the acquired value P32 to the acquired value P31 becomes equal to or less than the second predetermined value D2. On the other hand, if there is a leak in the purge passage 32, the acquired value P31 is maintained in a state in which a pressure decrease amount is small, and the acquired value P32 is maintained in a state in which the pressure decrease amount is large. As a result, the ratio of the acquired value P32 to the acquired value P31 becomes larger than the second predetermined value D2. As described above, when the ratio of the acquired value P32 to the acquired value P31 is larger than the second predetermined value D2 (No in S29), the control unit 40 diagnoses that there is a leak in the purge passage 32 (S38). When the acquired value P32 is larger than the first predetermined pressure PT1 (No in S28), it is diagnosed that there is some kind of failure (for example, there is a possibility that the canister 31 leaks), and the process proceeds to S37.

Next, the control unit 40 performs the opening control on the purge valve 33 (S31), calculates a difference between the atmospheric pressure P0 and the third pressure value P3, and diagnoses whether the difference is equal to or greater than a second predetermined pressure PT2 (S32). That is, the control unit 40 diagnoses whether the processing unit 30 (the canister 31) is maintained at a negative pressure. When the difference is equal to or greater than the second predetermined pressure PT2 (Yes in S32), the control unit 40 diagnoses that there is no open-sticking of the bypass valve 34 (S33). That is, in a case where there is the open-sticking in the bypass valve 34, when the purge valve 33 is actually opened, a communication state is established between the canister 31 and the intake passage 10a, and the processing unit 30 is in the atmosphere open state. In this state, the negative pressure of the processing unit 30 cannot be maintained. As a result, the control unit 40 can diagnose the presence or absence of open-sticking of the bypass valve 34. Therefore, when the difference is smaller than the second predetermined pressure PT2 (No in S32), the control unit 40 diagnoses that the bypass valve 34 is in the open-sticking (S39). When the control unit 40 diagnoses that the bypass valve 34 is in the open-sticking, the control unit 40 prohibits the fuel supply control (fuel supply is prohibited) as the fail-safe control (S41), returns the process to the first failure diagnosis, and records a flag indicating the end of the failure diagnosis.

On the other hand, when the control unit 40 diagnoses that there is no open-sticking of the bypass valve 34, the control unit 40 performs the opening control on the bypass valve 34 (S34), calculates a difference between the atmospheric pressure P0 and the third pressure value P3, and diagnoses whether the difference is equal to or less than a third predetermined pressure PT3 (S35). That is, in a state where the bypass valve 34 and the purge valve 33 are actually opened, the communication state is established between the canister 31 and the intake passage 10a, and the processing unit 30 is in the atmosphere open state. In this state, the third pressure value P3 returns to a value close to the atmospheric pressure P0. If the third pressure value P3 does not return to a value close to the atmospheric pressure P0, one or both of the purge valve 33 and the bypass valve 34 are in a closed-sticking state. Therefore, when the difference between the atmospheric pressure P0 and the third pressure value P3 is equal to or less than the third predetermined pressure PT3 which is a value close to the atmospheric pressure (Yes in S35), the control unit 40 diagnoses that there is no closed-sticking for both the purge valve 33 and the bypass valve 34 (S36). On the other hand, when the difference between the atmospheric pressure P0 and the third pressure value P3 is larger than the third predetermined pressure PT3 which is a value close to the atmospheric pressure (No in S35), the control unit 40 diagnoses that one or both of the purge valve 33 and the bypass valve 34 may be in the closed-sticking state (S40). When the above diagnosis ends, the control unit 40 opens the switching valve 36 (S37), ends the processing of the second failure diagnosis, and returns to the flow of the first failure diagnosis. When the diagnosis is completed, the control unit 40 records a diagnosis completion flag.

Next, a control procedure in the third failure diagnosis performed by the control unit 40 will be described with reference to the flowchart of FIG. 6 and the timing chart of FIG. 7. The third failure diagnosis is performed after the state V4 shown in the timing chart of FIG. 7.

In the third failure diagnosis, the control unit 40 diagnoses whether the negative pressure pump 35 is in operation (S50), and when the negative pressure pump 35 is not in operation (No in S50), the control unit 40 starts the negative pressure pump 35 (S51). The control unit 40 performs the opening control on the sealing valve 22 to open (S52), and performs the closing control, the opening control, and then closing control on the purge valve 33 (S53). As a result, if the purge valve 33 is not in closed-sticking, the fuel tank 21 communicates with the intake passage 10a and becomes the atmospheric pressure P0 (see time t8 to time t9 in FIG. 7).

The control unit 40 acquires the second pressure value P2 of the second tank pressure sensor 24 as an acquired value P21, and diagnoses whether the acquired value P21 is within a predetermined pressure range ΔPx (a range from −Px to +Px) as a first condition (S54). When the first condition is satisfied (Yes in S54), the control unit 40 diagnoses that the second tank pressure sensor 24 has not failed (S69). Here, when the second tank pressure sensor 24 is operating normally, the actual pressure of the fuel tank 21 becomes the atmospheric pressure P0. Therefore, the acquired value P21 should also be a value within the predetermined pressure range ΔPx and close to the atmospheric pressure P0 (refer to the solid line of the second pressure value P2 from the time t7 to the time t10 in FIG. 7). On the other hand, if the second tank pressure sensor 24 has a shift failure, the acquired value P21 is shifted from the range (refer to the broken line E1 of the second pressure value P2 from time t7 to time t10 in FIG. 7).

The control unit 40 performs the closing control on the switching valve 36 to start decreasing the pressure of the fuel tank 21 (S55). The control unit 40 diagnoses whether a change value ΔP1 of the first pressure value Pb acquired from the first tank pressure sensor 23 after the switching valve 36 is subjected to the closing control is a fifth predetermined pressure PT5 (for example, 1 kPa) as a second condition (S56). That is, in a case where the first pressure value P1 indicates a constant value even though the control unit 40 performs the opening control on the sealing valve 22 and controls the pressure of the fuel tank 21 to be decreased (refer to the two-dot chain line E2 from the time t10 to the time t11 of the first pressure value P1 in FIG. 7, No in S56), it is suspected that the first tank pressure sensor 23 is stuck, the sealing valve 22 is in the closed-sticking, and the bypass valve 34 is in the closed-sticking. On the other hand, when the first pressure value P1 changes (Yes in S56), the control unit 40 can diagnose that there are no failures such as the sticking of the first tank pressure sensor 23, the closed-sticking of the sealing valve 22, and the closed-sticking of the bypass valve 34 (S70).

The control unit 40 diagnoses a change value ΔP2 of the second pressure value P2 acquired from the second tank pressure sensor 24 after the switching valve 36 is subjected to the closing control is a fourth predetermined pressure PT4 (for example, 1 kPa) as a third condition (S57). That is, in a case where the second pressure value P2 indicates a constant value even though the control unit 40 performs the opening control on the sealing valve 22 and controls the pressure of the fuel tank 21 to be decreased (refer to the two-dot chain line E3 from the time t10 to the time t11 of the second pressure value P2 in FIG. 7, No in S57), it is suspected that the sealing valve 22 is in the closed-sticking, and the bypass valve 34 is in the closed-sticking. The first tank pressure sensor 23 is provided in the vapor passage 25, and the second tank pressure sensor 24 is provided in an upper portion of the fuel tank 21. Therefore, the vapor passage 25 is suspected to be clogged. On the other hand, when the second pressure value P2 changes (Yes in S57), the control unit 40 can diagnose that there are no failures such as the closed-sticking of the sealing valve 22, the closed-sticking of the bypass valve 34, and the clogging of the vapor passage 25 (S71).

The control unit 40 determines whether the second condition and the third condition described above are satisfied (S58). However, regardless of whether the second condition and the third condition are satisfied (Yes in S58, No in S58), the control unit 40 continues the pressure decrease until a third predetermined period Tm3 elapses after the switching valve 36 is subjected to the closing control to start decreasing the pressure of the fuel tank 21 (No in S59). On the other hand, when the third predetermined period Tm3 has elapsed (Yes in S59), the control unit 40 proceeds the process to S60.

The control unit 40 acquires a change value ΔP3 of the third pressure value P3 detected by the canister pressure sensor 37 after the switching valve 36 is subjected to the closing control, and diagnoses whether the change value ΔP3 of the third pressure value P3 is decreased to a sixth predetermined pressure PT6 lower than the reference pressure Pref (S60). When the third pressure value P3 is not equal to the sixth predetermined pressure PT6 (No in S60), the control unit 40 continues until a fourth predetermined period Tm4 elapses after the pressure decrease (No in S74). As a result, the control unit 40 can diagnose that the cause of no change in one or both of the first pressure value P1 and the second pressure value P2 is not an operation failure of the module 38 including the negative pressure pump 35 or a failure of leakage or clogging of the canister 31. Therefore, the control unit 40 specifies a failure portion that causes no change in one or both of the first pressure value P1 and the second pressure value P2 by combining the first condition to the third condition. On the other hand, when the third pressure value P3 is not equal to the sixth predetermined pressure PT6 (No in S60) and the fourth predetermined period Tm4 has elapsed after the pressure decrease, the process returns to the first failure diagnosis (Yes in S74).

When only the second condition is not satisfied, the control unit 40 determines that the first tank pressure sensor 23 is stuck (S72). That is, when the second pressure value P2 normally changes and only the first pressure value P1 does not change, the pressure in the fuel tank 21 is actually decreased, and it can be determined that the first tank pressure sensor 23 is stuck. When the control unit 40 determines that the first tank pressure sensor 23 is stuck, the control unit 40 prohibits the pressure control as the fail-safe control (S73), returns the process to the first failure diagnosis, and records a flag indicating the end of the failure diagnosis.

In a case where the second condition is satisfied (Yes in S61) and only the third condition is not satisfied (Yes in S62), the control unit 40 specifies that the vapor passage 25 is clogged (S65). That is, if the first pressure value P1 normally changes and only the second pressure value P2 does not change, it is suspected that the second tank pressure sensor 24 is stuck or the vapor passage 25 between the second tank pressure sensor 24 and the first tank pressure sensor 23 is clogged.

Here, the control unit 40 detects the pressure in the fuel tank 21 by the second tank pressure sensor 24 while the ignition switch 40a is on, so as to record that there is no sticking of the second tank pressure sensor 24. Therefore, the control unit 40 can specify that the vapor passage 25 is clogged. When the control unit 40 specifies that the vapor passage 25 is clogged, the control unit 40 prohibits the fuel supply control and the pressure control as the fail-safe control (S66), returns the process to the first failure diagnosis, and records a flag indicating the end of the failure diagnosis.

When the second condition and the third condition are satisfied (No in S62, Yes in S58), the control unit 40 diagnoses whether the first condition is satisfied (Step S63). In a case where the first condition is not satisfied (No in S63), the control unit 40 specifies that the shift failure of the second tank pressure sensor 24 has occurred (S67). That is, in a case where the first tank pressure sensor 23 is not stuck and the vapor passage 25 is not clogged, and only the first condition is not satisfied, the control unit 40 can specify that the shift failure of the second tank pressure sensor 24 is the cause because the second pressure value P2 is an abnormal value. When the control unit 40 specifies that the shift failure of the second tank pressure sensor 24 has occurred, the control unit 40 prohibits the fuel supply control as the fail-safe control (S68). On the other hand, when the first condition is satisfied (Yes in S63), the control unit 40 can diagnose that none of the sticking of the first tank pressure sensor 23, the shift failure of the second tank pressure sensor 24, and the clogging of the vapor passage 25 has occurred. That is, the failure diagnosis of the devices except for the sealing valve 22 in the fuel storage unit 20 is completed, it is diagnosed that there is a failure of the closed-sticking of the purge valve 33 and the bypass valve 34 of the processing unit 30, the open-sticking or the closed-sticking of the sealing valve 22 of the fuel storage unit 20, and the process proceeds to a failure diagnosis of another failure portions, and then returns to the first failure diagnosis (S64). When any failure is specified in another failure portions, the control unit 40 records a flag of a finish of failure diagnosis.

As explained in the above, according to the fuel tank system 1, the failure of clogging of the vapor passage 25 would be specified. If the control unit 40 specifies the clogging of the vapor passage 25, the fuel supply control would be prohibited as a failsafe control.

In contrast, when if the control unit does not specify the clogging of the vapor passage 25, the pressure control and the fuel supply control would not be prohibited. The user would realize that the fuel supply is unavailable for the first time when the pressure control and the fuel supply control stop halfway due to any errors after their starts at the fuel supply operation (at pressing the fuel supply button).

If the control unit 40 can specify that the failure is the clogging of the vapor passage 25 as in the fuel tank system 1 of the present disclosure, the user can be alerted that the fuel control is prohibited in advance of the user's fuel supply operation. As a result, even when the vapor passage 25 is clogged, a deterioration of a usability would be suppressed.

Other Embodiments

Although the embodiment of the present disclosure has been described above, the present disclosure is not limited to the above-described embodiment, and various modifications can be made without departing from the gist of the invention. In particular, a plurality of modifications described in the present specification can be optionally combined as necessary.

In the above embodiment, although the first tank pressure sensor and the second tank pressure sensor have different arrangements and different detection characteristics, the present disclosure is not limited thereto. The first tank pressure sensor and the second tank pressure sensor may be different from each other in either the arrangement or the detection characteristic.

In the above embodiment, although the processing unit 30 includes the bypass valve 34 as the second on-off valve, the present disclosure is not limited thereto. If there is no bypass valve 34, the control unit 400 may perform only a failure diagnosis of the closed-sticking of the purge calve 33 in a condition that the sealing valve 22 is closed.

In the above embodiment, although the processing unit 30 uses the negative pressure pump 35 as the pressure generation unit, the present disclosure is not limited thereto. The pressure generation unit may be a pressure pump.

The present application is based on Japanese Patent Application No. 2019-139522 filed on Jul. 30, 2019, the contents of which are incorporated herein as reference.

REFERENCE SIGNS LIST 1 fuel tank system
10 internal combustion engine
10a intake passage
20 fuel storage unit
21 fuel tank
22 sealing valve
23 first tank pressure sensor (first pressure detection unit)
24 second tank pressure sensor (second pressure detection unit)
25 vapor passage
30 processing unit
31 canister
32 purge passage
33 purge valve (first on-off valve)
34 bypass valve (second on-off valve)
35 negative pressure pump
36 switching valve
37 canister pressure sensor (third pressure detection unit)
40 control unit
40a ignition switch
C vehicle P0 atmospheric pressure
P1 first pressure value
P2 second pressure value
P3 third pressure value

The invention claimed is:

1. A fuel tank system for a vehicle having an internal combustion engine, the fuel tank system comprising:
  a fuel storage unit having a sealing valve and configured to seal a fuel tank that stores fuel;
  a processing unit configured to process fuel evaporative gas in the fuel tank; and
  a control unit configured to diagnose a failure of the fuel storage unit and the processing unit,
  wherein the fuel storage unit includes
    a first pressure detection unit configured to detect a pressure of the fuel tank, and
    a second pressure detection unit disposed at a position different from the first pressure detection unit and configured to detect a pressure of the fuel tank, and
    a vapor passage through which the fuel tank and the sealing valve are communicated with each other,
  wherein the processing unit includes
    a purge passage through which the sealing valve and an intake passage of the internal combustion engine are communicated with each other,
    a first on-off valve configured to be opened and closed between the intake passage and the purge passage,
    a canister connected to the purge passage between the sealing valve and the first on-off valve and configured to adsorb fuel evaporative gas in the fuel tank, and
    a pressure generation unit connected to the canister and configured to generate pressure, and
  wherein the control unit is configured to specify a presence or an absence of a clogging of the vapor passage based on a first pressure value detected by the first pressure detection unit and a second pressure value detected by the second pressure detection unit when the pressure in the fuel tank is changed by the pressure generation unit in a condition that the sealing valve is controlled to be opened.

2. The fuel tank system according to claim 1,
  wherein control unit is configured to
    record a presence or an absence of a sticking of the second pressure detection unit, during an ignition switch of the vehicle is switched on,
    specify that the vapor passage is clogged, when the first pressure value is changed, the second pressure value is unchanged, and there is no sticking in the second pressure detection unit, after a predetermined time period has passed in a condition that the sealing valve is opened and the pressure in the fuel tank is changed by the pressure generation unit.

3. The fuel tank system according to claim 1,
  wherein the control unit is configured to perform
    a pressure control for lowering the pressure in the fuel tank, and
    a fuel supply control for allowing a fuel supply port to be opened, the fuel supply port being a supply port of the fuel tank, and
  wherein the control unit is configured to prohibit the pressure control and the fuel supply control, when the vapor passage is specified as being clogged.

4. The fuel tank system according to claim 1, wherein the first pressure detecting unit comprises an absolute pressure sensor configured to detect an absolute pressure in the fuel tank, and
  wherein the second pressure detecting unit comprises a differential pressure sensor configured to detect the pressure in the fuel tank based on an atmospheric pressure.

5. The fuel tank system according to claim 1, wherein the first pressure detecting unit is provided to the vapor passage, and
  wherein the second pressure detecting unit is provided to the fuel tank.

6. The fuel tank system according to claim 2,
  wherein the control unit is configured to perform
    a pressure control for lowering the pressure in the fuel tank, and
    a fuel supply control for allowing a fuel supply port to be opened, the fuel supply port being a supply port of the fuel tank, and
  wherein the control unit is configured to prohibit the pressure control and the fuel supply control, when the vapor passage is specified as being clogged.

7. The fuel tank system according to claim 2, wherein the first pressure detecting unit comprises an absolute pressure sensor configured to detect an absolute pressure in the fuel tank, and
  wherein the second pressure detecting unit comprises a differential pressure sensor configured to detect the pressure in the fuel tank based on an atmospheric pressure.

8. The fuel tank system according to claim 3, wherein the first pressure detecting unit comprises an absolute pressure sensor configured to detect an absolute pressure in the fuel tank, and
  wherein the second pressure detecting unit comprises a differential pressure sensor configured to detect the pressure in the fuel tank based on an atmospheric pressure.

9. The fuel tank system according to claim 6, wherein the first pressure detecting unit comprises an absolute pressure sensor configured to detect an absolute pressure in the fuel tank, and
  wherein the second pressure detecting unit comprises a differential pressure sensor configured to detect the pressure in the fuel tank based on an atmospheric pressure.

10. The fuel tank system according to claim 2, wherein the first pressure detecting unit is provided to the vapor passage, and
  wherein the second pressure detecting unit is provided to the fuel tank.

11. The fuel tank system according to claim 3, wherein the first pressure detecting unit is provided to the vapor passage, and
  wherein the second pressure detecting unit is provided to the fuel tank.

12. The fuel tank system according to claim 4, wherein the first pressure detecting unit is provided to the vapor passage, and
  wherein the second pressure detecting unit is provided to the fuel tank.

13. The fuel tank system according to claim 6, wherein the first pressure detecting unit is provided to the vapor passage, and
  wherein the second pressure detecting unit is provided to the fuel tank.

14. The fuel tank system according to claim 7, wherein the first pressure detecting unit is provided to the vapor passage, and wherein the second pressure detecting unit is provided to the fuel tank.

15. The fuel tank system according to claim 8, wherein the first pressure detecting unit is provided to the vapor passage, and wherein the second pressure detecting unit is provided to the fuel tank.

16. The fuel tank system according to claim 9, wherein the first pressure detecting unit is provided to the vapor passage, and wherein the second pressure detecting unit is provided to the fuel tank.

\* \* \* \* \*